(12) United States Patent
Ohtsubo et al.

(10) Patent No.: US 7,214,359 B2
(45) Date of Patent: May 8, 2007

(54) CUBIC BORON NITRIDE, CATALYST FOR SYNTHESIZING CUBIC BORON NITRIDE, AND METHOD FOR PRODUCING CUBIC BORON NITRIDE

(75) Inventors: Hirohiko Ohtsubo, Tokyo (JP); Eiji Ihara, Shiojiri (JP); Katsuyuki Tsuji, Shiojiri (JP)

(73) Assignee: Showa Denko K.K., Tokyo (JP)

( * ) Notice: Subject to any disclaimer, the term of this patent is extended or adjusted under 35 U.S.C. 154(b) by 12 days.

(21) Appl. No.: 10/768,737

(22) Filed: Feb. 2, 2004

(65) Prior Publication Data

US 2004/0265203 A1 Dec. 30, 2004

Related U.S. Application Data

(60) Provisional application No. 60/445,858, filed on Feb. 10, 2003.

(30) Foreign Application Priority Data

Feb. 3, 2003 (JP) ............................ 2003-026063

(51) Int. Cl.
- *B01J 31/02* (2006.01)
- *B01J 31/04* (2006.01)
- *C01B 21/064* (2006.01)

(52) U.S. Cl. .................. 423/290; 502/150; 502/172

(58) Field of Classification Search ............... 502/150, 502/172; 423/290
See application file for complete search history.

(56) References Cited

U.S. PATENT DOCUMENTS

| | | | |
|---|---|---|---|
| 2,947,617 A | | 8/1960 | Wentorf et al. |
| 3,661,521 A | | 5/1972 | Birle |
| 3,772,428 A | * | 11/1973 | De Vries et al. ............ 423/290 |
| 4,287,164 A | * | 9/1981 | Endo et al. ................. 423/290 |
| 4,551,316 A | | 11/1985 | Iizuka |
| 4,883,648 A | * | 11/1989 | Davies et al. ................. 117/78 |
| 4,971,779 A | * | 11/1990 | Paine et al. ................. 423/290 |
| 5,000,760 A | | 3/1991 | Ohtsubo et al. |
| 5,340,780 A | | 8/1994 | Sumiya |
| 2003/0170161 A1 | | 9/2003 | Iizuka |

FOREIGN PATENT DOCUMENTS

| | | | |
|---|---|---|---|
| EP | 0 402 672 A2 | | 12/1990 |
| EP | 0 512 762 A2 | | 11/1992 |
| JP | 48-55900 | | 8/1973 |
| JP | 49-27757 | | 7/1974 |
| JP | 53-106698 | | 9/1978 |
| JP | 58-084106 A | | 5/1983 |
| JP | 58-120505 A | | 7/1983 |
| JP | 59-018105 A | | 1/1984 |
| JP | 59-057905 A | | 4/1984 |
| JP | 59-073410 A | | 4/1984 |
| JP | 59-073411 A | | 4/1984 |
| JP | 59-217608 A | | 12/1984 |
| JP | 64-56130 | * | 3/1989 ............... 423/290 |
| JP | 1-168328 | * | 7/1989 ............... 423/290 |
| JP | 1-168329 | * | 7/1989 ............... 423/290 |
| JP | 01-168329 A | | 7/1989 |
| JP | 02-035931 A | | 2/1990 |
| JP | 02-036293 A | | 2/1990 |
| JP | 02-115034 A | | 4/1990 |
| JP | 02-233510 A | | 9/1990 |
| JP | 03-045561 A | | 2/1991 |
| JP | 03-075298 A | | 3/1991 |
| JP | 03-080929 A | | 4/1991 |
| JP | 05-146664 A | | 6/1993 |
| JP | 10-113877 A | | 5/1998 |
| JP | 2000-246647 A | | 9/2000 |
| JP | 2000-290005 A | | 10/2000 |
| JP | 2002-284511 A | | 10/2002 |

OTHER PUBLICATIONS

Webster's New Collegiate Dictionary (1979), G. & C. Merriam Co.(p. 327) (no month).*
English language abstract, abstracting JP 48-55900, published Aug. 6, 1973.
English-language Patent Abstracts of Japan, abstracting JP 53-106698, published Sep. 16, 1978.
English-language Patent Abstracts of Japan, abstracting JP 58-084106, published May 20, 1983.
English-language Patent Abstracts of Japan, abstracting JP 58-120505 published Jul. 18, 1983.
English-language Patent Abstracts of Japan, abstracting JP 59-018105, published Jan. 30, 1984.
English-language Patent Abstracts of Japan, abstracting JP 59-057905, published Apr. 3, 1984.
English-language Patent Abstracts of Japan, abstracting JP 59-073410, published Apr. 25, 1984.
English-language Patent Abstracts of Japan, abstracting JP 59-073411, published Apr. 25, 1984.
English-language Patent Abstracts of Japan, abstracting JP 59-217608 published Jul. 12, 1984.
English-language Patent Abstracts of Japan, abstracting JP 01-168329, published Jul. 3, 1989.
English-language Patent Abstracts of Japan, abstracting JP 02-036293, published Feb. 6, 1990.
English-language Patent Abstracts of Japan, abstracting JP 02-035931, published Feb. 6, 1990.

(Continued)

*Primary Examiner*—Wayne A. Langel
(74) *Attorney, Agent, or Firm*—Sughrue Mion, PLLC

(57) ABSTRACT

By using a CBN synthesis catalyst containing a CBN synthesis catalyst component coated with an organic substance for producing cubic boron nitride (CBN), the CBN can be produced at a high transformation ration and a high yield ratio. Each of the CBN grains produced through this method has a sharp shape with a highly developed (111) plane, exhibits high strength, and exhibits a small reduction in strength due to heating. The amount of catalyst component contained in the CBN is $7.5 \times 10^{-4}$ mol or less per 1 mol of CBN.

16 Claims, No Drawings

OTHER PUBLICATIONS

English-language Patent Abstracts of Japan, abstracting JP 02-115034, published Apr. 27, 1990.

English-language Patent Abstracts of Japan, abstracting JP 02-233510 published Sep. 17, 1990.

English-language Patent Abstracts of Japan, abstracting JP 03-045561 published Feb. 27, 1991.

English-language Patent Abstracts of Japan, abstracting JP-03-075298, published Mar. 29, 1991.

English-language Patent Abstracts of Japan, abstracting JP 03-080929, published Apr. 5, 1991.

English-language Patent Abstracts of Japan, abstracting JP 05-146664 published Jun. 15, 1993.

English-language Patent Abstracts of Japan, abstracting JP 10-113877, published May 6, 1998.

English-language Patent Abstracts of Japan, abstracting JP 2000-246647, published Sep. 12, 2000.

English-language Patent Abstracts of Japan, abstracting JP 2000-290005, published Oct. 17, 2000.

English-language Patent Abstracts of Japan, abstracting JP 2002-284511, published Oct. 3, 2002.

* cited by examiner

CUBIC BORON NITRIDE, CATALYST FOR SYNTHESIZING CUBIC BORON NITRIDE, AND METHOD FOR PRODUCING CUBIC BORON NITRIDE

This application claims priority to Japanese Patent Application No. 2003-026063 filed on Feb. 3, 2003 and U.S. Provisional Patent Application No. 60/445,858 filed on Feb. 10, 2003, the disclosure of which is incorporated by reference in its entirety.

BACKGROUND OF THE INVENTION

1. Field of the Invention

The present invention relates to cubic boron nitride (hereinafter referred to as CBN) employed in a grinding wheel or a similar device; to a CBN synthesis catalyst (hereinafter may be referred to as solvent) employed for producing CBN from hexagonal boron nitride (hereinafter referred to as HBN); and to a method for producing CBN by use of the CBN synthesis catalyst.

2. Background Art

CBN is second to diamond in hardness and has chemical stability higher than that of diamond. Thus, cubic boron nitride is increasingly employed as abrasive grains for producing grinding material, polishing material, or cutting material. A variety of methods for producing cubic boron nitride have been proposed. Among them, best known and widely employed in the industrial field is a method in which HBN is maintained in the presence of a CBN synthesis catalyst substance under conditions where cubic boron nitride remains thermodynamically stable (approximately 4 to 6 GPa, approximately 1,400 to 1,600° C.), to thereby transform hexagonal boron nitride into cubic boron nitride (see, for example, Patent Documents 1 to 7). CBN synthesis catalysts known to be employed in the above production include an alkali metal, an alkaline earth metal, an alkali metal nitride, an alkali metal boronitride, an alkaline earth metal nitride, an alkaline earth metal boronitride, and other similar compounds, and these compounds are used singly or in combination of two or more species. Since these CBN synthesis catalysts are usually added to HBN serving as a starting material, the catalysts are generally used in the form of powder, agglomerates, etc. so as to readily form a mixture with HBN.

These CBN synthesis catalysts, having high reactivity with oxygen, water, or a similar substance, are readily deteriorated to form substances such as oxides, hydroxides, or carbonates. As has been known, when the catalytic performance of the catalysts is thus deteriorated, characteristics of formed CBN, its production yield, and other properties are adversely affected. Therefore, these CBN synthesis catalysts are handled with the utmost care in a chamber such as a gloved box where dry nitrogen gas flow or similar gas flow is maintained so as to prevent deterioration or denaturation of the CBN synthesis catalysts caused by contact with water moisture, oxygen, carbon dioxide, etc.

As has also been known, deterioration of these catalysts is promoted by oxygen or water contained in raw material during synthesis of CBN. In this connection, there has been disclosed a method for preventing deterioration of a CBN synthesis catalyst including, for example, removing an oxygen source (predominantly containing oxides such as boron oxide) contained in starting HBN (see, for example, Patent Documents 8 to 13). These documents also disclose a method for removing an oxygen source such as boron oxide contained in starting HBN during synthesis, which method includes adding a carbon source to the starting material, and a method for removing an oxygen source, which method includes reducing starting HBN before performing synthesis of CBN; heating starting HBN to which a carbon source has been added; or a similar step.

Through any of these methods, the oxygen source contained in starting HBN is decreased, thereby preventing deterioration of the catalyst, leading to enhanced CBN characteristics and improved production yield.

Patent Document 1
Japanese Patent Application Laid-Open (kokai) No. 58-84106 (U.S. Pat. No. 4,551,316)
Patent Document 2
U.S. Pat. No. 2,947,617 specification
Patent Document 3
Japanese Patent Application Laid-Open (kokai) No. 59-57905
Patent Document 4
Japanese Patent Application Laid-Open (kokai) No. 59-73410
Patent Document 5
Japanese Patent Application Laid-Open (kokai) No. 59-73411
Patent Document 6
Japanese Patent Application Laid-Open (kokai) No. 59-18105
Patent Document 7
Japanese Patent Application Laid-Open (kokai) No. 2002-284511 (U.S. Pat. No. 2003-170,161 A1)
Patent Document 8
Japanese Patent Application Laid-Open (kokai) No. 2-35931 (U.S. Pat. No. 5,000,760)
Patent Document 9
Japanese Patent Application Laid-Open (kokai) No. 2-36293 (U.S. Pat. No. 5,000,760)
Patent Document 10
Japanese Patent Application Laid-Open (kokai) No. 2-233510
Patent Document 11
Japanese Patent Application Laid-Open (kokai) No. 2-115034
Patent Document 12
Japanese Patent Application Laid-Open (kokai) No. 59-217608
Patent Document 13
Japanese Patent Application Laid-Open (kokai) No. 1-168329
Patent Document 14
Japanese Patent Application Laid-Open (kokai) No. 58-120505
Patent Document 15
Japanese Patent Application Laid-Open (kokai) No. 48-55900
Patent Document 16
Japanese Patent Application Laid-Open (kokai) No. 3-80929 (EP No. 0,402,672 A)
Patent Document 17
Japanese Patent Application Laid-Open (kokai) No. 5-146664 (EP No. 0,512,762 A)

As is described in the above disclosed methods, CBN grown inhibitors such as boron oxide contained in the starting HBN are removed through addition of a carbon source to HBN, thereby attaining effects such as ready production of crystals having sharp edges or large crystals by virtue of reduced inhibition of development of crystal plane; ready formation of CBN nuclei; and enabling synthesis under milder conditions. In other words, the carbon source employed in these methods is considered to provide the effect of removing impurities contained in starting HBN and to provide the effect of enhancing characteristics and production yield of CBN.

However, even when the impurities contained in the starting HBN have been removed, the strength of the formed CBN is not sufficiently enhanced, and drop in strength caused by heating remains large. Such an unsatisfactory strength is conceived to be attributed to a catalyst component incorporated into CBN during synthesis of CBN. As has been also reported (see, for example, Patent Documents 14 to 17), incorporation of the added carbon source makes CBN more breakable.

Therefore, when a grinding wheel is fabricated from such a CBN product, CBN particles are readily worn out or broken during use of the grinding wheel under severe process conditions such as high load grinding. Thus, CBN having high strength and high heat resistance has been keenly demanded. Needless to say, although conventional CBN synthesis catalysts to which no carbon source has been added exhibit no drop in strength of CBN crystals—such a drop in strength being caused by incorporation of the carbon source—the conventional catalysts exert no effect of removing a CBN growth inhibitor contained in starting HBN, and desired improvement in characteristics and production yield of CBN may fail to be attained due to the presence of a growth inhibitor, incorporation of impurities into CBN, or other factors.

SUMMARY OF THE INVENTION

The present inventors have carried out extensive studies in order to solve the problem that CBN which has been produced by adding a carbon source to the CBN synthesis raw material does not provide satisfactory performance for use under severe process conditions such as high load grinding, although characteristics and production yield of CBN are enhanced. As a result, the inventors have found that enhancement of the strength of CBN as well as prevention of drop in strength of CBN during heating can be attained through removal or reduction of an impurity (catalyst-deteriorating component) contained in a CBN synthesis catalyst, among impurities contained in the raw materials. The present invention has been accomplished on the basis of this finding.

In the method according to the present invention, the strength of CBN is enhanced by reducing or suppressing a component deteriorating the CBN synthesis catalyst. Thus, in contrast to a conventional method, incorporation of an employed organic substance into CBN in the form of carbon is considered difficult. Furthermore, since drop in strength of CBN after heating is prevented, the amount of a catalyst component incorporated into CBN seems to be decreased.

Accordingly, the present invention encompasses the following:

(1) cubic boron nitride containing a cubic boron nitride synthesis catalyst component in an amount, per mole of cubic boron nitride, of $7.5\times10^{-4}$ mol or less;

(2) cubic boron nitride as described in (1), wherein the cubic boron nitride synthesis catalyst component contained in cubic boron nitride contains at least one species selected from among an alkali metal and an alkaline earth metal;

(3) cubic boron nitride as described in (1) or (2), wherein the cubic boron nitride synthesis catalyst component contained in cubic boron nitride contains at least one species selected from among lithium, calcium, magnesium, and barium;

(4) cubic boron nitride as described in (1), wherein the cubic boron nitride synthesis catalyst component contained in cubic boron nitride contains lithium or calcium;

(5) cubic boron nitride as described in any one of (1) to (4), which contains a cubic boron nitride synthesis catalyst component in an amount, per mole of cubic boron nitride, of $5.0\times10^{-4}$ mol or less;

(6) cubic boron nitride as described in (5), which contains a cubic boron nitride synthesis catalyst component in an amount, per mole of cubic boron nitride, of $2.5\times10^{-4}$ mol or less;

(7) cubic boron nitride as described in any one of (1) to (6), which, after heating at 1,100° C. for one hour in the atmosphere, exhibits a percent drop in toughness value of 10% or less;

(8) a cubic boron nitride synthesis catalyst having an organic substance layer formed on the surface thereof;

(9) a cubic boron nitride synthesis catalyst as described in (8), wherein the organic substance layer contains an organic substance which is chemically bonded with the cubic boron nitride synthesis catalyst;

(10) a cubic boron nitride synthesis catalyst as described in (8) or (9), which contains at least one species selected from the group consisting of an alkali metal, an alkaline earth metal, an alkali metal nitride, an alkaline earth metal nitride, an alkali metal boronitride, an alkaline earth metal boronitride, a complex alkali metal boronitride, a complex alkaline earth metal boronitride, and a complex alkali metal-alkaline earth metal boronitride;

(11) a cubic boron nitride synthesis catalyst as described in (10), which is a nitride or a boronitride;

(12) a cubic boron nitride synthesis catalyst as described in (11), which contains at least one species selected from the group consisting of lithium nitride, lithium boronitride, calcium nitride, calcium boronitride, barium nitride, barium boronitride, lithium calcium boronitride, and lithium barium boronitride;

(13) a cubic boron nitride synthesis catalyst as described in (12), which contains at least one species selected from lithium calcium boronitride and lithium barium boronitride;

(14) a cubic boron nitride synthesis catalyst as described in (13), which is lithium barium boronitride;

(15) a cubic boron nitride synthesis catalyst as described in any one of (8) to (14), wherein the organic substance layer contains an organic substance which is at least one species selected from the group consisting of a hydrocarbon, an alcohol, an ether, an amine, an aldehyde, a ketone, a carboxylic acid, an ester, and an amide;

(16) a cubic boron nitride synthesis catalyst as described in any one of (8) to (15), wherein the organic substance layer contains an organic substance which is at least one species selected from the group consisting of a hydrocarbon, an amine, and an amide;

(17) a cubic boron nitride synthesis catalyst as described in (16), wherein the organic substance contained in the organic substance layer is an amine;

(18) a cubic boron nitride synthesis catalyst as described in (17), wherein the organic substance contained in the organic substance layer is octadecylamine;

(19) a cubic boron nitride synthesis catalyst as described in any one of (8) to (15), wherein the organic substance layer contains an organic substance which is at least one species selected from the group consisting of an alcohol, an ether, an aldehyde, a ketone, a carboxylic acid, and an ester;

(20) a cubic boron nitride synthesis catalyst as described in (19), wherein the organic substance contained in the organic substance layer has eight or more carbon atoms;

(21) a cubic boron nitride synthesis catalyst as described in (20), wherein the organic substance contained in the organic substance layer is decanoic acid or octadecanoic acid;

(22) a cubic boron nitride synthesis catalyst as described in any one of (8) to (15), wherein the organic substance contained in the organic substance layer is a compound having no oxygen in the molecule thereof;

(23) cubic boron nitride which is synthesized by use of a cubic boron nitride synthesis catalyst as recited in any one of (8) to (22);

(24) a method for producing cubic boron nitride which includes synthesizing cubic boron nitride by use of a cubic boron nitride synthesis catalyst as recited in any one of (8) to (22);

(25) a grinding wheel employing cubic boron nitride as recited in any one of (1) to (7) and (23); and

(26) a grinding wheel as described in (25), which employs a glassy vitrified bond as a binder.

MODES FOR CARRYING OUT THE INVENTION

The present invention will next be described in detail.

The CBN of the present invention is in the form of a crystal having an amount of a CBN synthesis catalyst component incorporated into CBN lower than that of the CBN synthesized through a conventional method. That is, crystal faults possibly attributable to incorporation of such a catalyst component into the CBN crystal are few, and the extent of deterioration of the crystal caused by heating is small. Therefore, the CBN of the present invention is thought to be endowed with high strength and small drop in strength during heating.

Among CBN synthesis methods, some employs a catalyst, whereas others do not employ a catalyst. CBN which has been synthesized through a method without use of a catalyst is generally polycrystalline or microcrystalline CBN. Basically, incorporation of a catalyst component incorporated into such CBN does not occur, since no catalyst is used during synthesis. This CBN has high strength; however, the microcrystalline structure of the CBN induces oxidation during heating, thereby lowering the strength considerably caused by heating. In contrast, the CBN of the present invention is substantially formed of a single crystal and has been synthesized in the presence of a catalyst, and includes no CBN of polycrystalline or microcrystalline structures which is synthesized without any catalyst.

The preferred amount of a CBN synthesis catalyst component (as a metallic element such as an alkali metal or an alkaline earth element contained in the catalyst component) incorporated into a CBN crystal is $7.5 \times 10^{-4}$ mol or less per mole of BN molecules, preferably $5.0 \times 10^{-4}$ mol or less, more preferably $2.5 \times 10^{-4}$ mol or less. When the catalyst component is incorporated into a CBN crystal in an amount of $7.5 \times 10^{-4}$ mol or more per mole of BN molecules, the strength of CBN decreases considerably, possibly due to formation of crystal faults or other factors. In the case where the temperature of CBN is elevated during grinding or a similar process, a catalyst component which has been incorporated into CBN reacts with CBN through heating, thereby deteriorating the crystal, resulting in a large drop in strength of CBN.

The CBN synthesis catalyst of the present invention contains a small amount of a catalyst-deteriorating component such as an oxide, a hydroxide, or a carbonate or contains no catalyst-deteriorating component. More precisely, the CBN synthesis catalyst of the present invention has an organic substance layer formed on the surfaces of catalyst particles through reaction of the catalyst particle surfaces with an organic substance containing carbon and hydrogen as predominant components.

As the CBN synthesis catalyst component, any catalysts which allow transformation of HBN to CBN can be employed. Specific examples include alkali metals (e.g., Li), nitrides thereof (e.g., $Li_3N$), boronitrides thereof (e.g., $Li_3BN_2$), alkaline earth metals (e.g., Ca, Mg, Sr, and Ba), nitrides thereof (e.g., $Ca_3N_2$, $Mg_3N_2$, $Sr_3N_2$, and $Ba_3N_2$), boronitrides thereof (e.g., $Ca_3B_2N_4$, $Mg_3B_2N_4$, $Sr_3B_2N_4$, and $Ba_3B_2N_4$), and complex boronitrides containing an alkali metal and an alkaline earth metal (e.g., $LiCaBN_2$ and $LiBaBN_2$). These catalysts may be used singly or in combination of two or more species.

No particular limitation is imposed on the form of CBN synthesis catalyst component. However, a powder having a particle size of 150 μm or less (a 150 mesh size or smaller) is preferred. This is because, when the particle size of the CBN synthesis catalyst component is excessively large, reactivity with HBN during synthesis of CBN under high temperature and high pressure conditions may be reduced.

In order to prevent formation of a catalyst-deteriorating component on the catalyst surface, the CBN synthesis catalyst is preferably handled in, for example, a gloved box which is operated under controlled conditions; e.g., an oxygen concentration of 100 ppm or less, a dew point of −60° C. or lower, and an inert gas atmosphere such as nitrogen gas.

In order to form an organic substance layer, the organic substance for forming the organic substance layer on the catalyst component surface is brought into contact with the catalyst preferably in the form of liquid or gas, from the viewpoint of reactivity with the catalyst surface. When the organic substance layer is formed from an organic substance which is solid at ambient temperature, the organic substance may be brought into contact with the catalyst through mechanical means such as mixing. However, more preferably, the organic substance is heated to a temperature not lower than the melting temperature of the organic substance during mixing, thereby forming an organic substance layer.

The CBN synthesis catalyst-deteriorating component is considered to be present predominantly on the catalyst particle surface. Therefore, deterioration possibly occurs during handling, such as pulverization of the catalyst, or when the catalyst is mixed with the starting HBN. Also, the catalyst is conceived to be deteriorated by an oxygen impurity such as boron oxide which has been dissolved in HBN in the course of deposition of CBN from the starting HBN dissolved in the catalyst component, or deteriorated during synthesis by water or a similar substance contained in synthesis raw material.

Therefore, in order to reduce or remove the catalyst-deteriorating component, the catalyst-deteriorating component must be reduced or removed during handling before performing of the synthesis, and also formation of the catalyst-deteriorating component must be prevented during synthesis of CBN.

When deterioration of the catalyst component progresses, growth of CBN during synthesis is inhibited. In addition, the thus-deteriorated catalyst component is incorporated into a CBN crystal, thereby forming crystal faults. The crystal faults reacts with CBN during heating, thereby reducing the strength of the crystal.

Deterioration of the CBN catalyst component during handling of the catalyst can be prevented by handling the catalyst under conditions where oxygen content and water content are rigorously controlled. For example, the catalyst is handled in a gloved box which is operated under dry nitrogen gas. However, since the thus-handled catalyst still has a highly reactive surface, the catalyst reacts with impurities such as boron oxide contained in starting HBN and water during mixing with the starting HBN, thereby forming a catalyst-deteriorating component. Furthermore, deterioration of the catalyst component is considered to progress also in cases such as contact with the atmosphere during feeding thereof to a synthesis apparatus and melting the starting HBN during synthesis.

Meanwhile, Patent Document 14 discloses methods of combining raw material powder with an organic substance (e.g., synthetic resin, oil and fat, or alcohol) which decomposes, under high temperature/pressure conditions for synthesizing CBN, to form a carbon residue so as to incorporate carbon into CBN particles in an amount of 0.02 to 2.0%. The methods include mixing the organic substance with the raw material powder, impregnation of a compact of the raw material powder with a liquid or a solution of the organic substance, and coating the raw material powder or a compact thereof with the organic substance through vapor deposition or application. Patent Document 14 does not include in its Examples section the cases where a CBN synthesis catalyst is coated with an organic substance. As mentioned later in the Comparative Examples of the present specification, characteristics and yield of CBN obtained according to the method of Patent Document 14 are inferior to those obtained through the method of the present invention. Although the reason that explains deteriorated characteristics has not been elucidated in detail, one conceivable reason speculated on the basis of the amount of carbon or a catalyst component incorporated into CBN is that a stable organic layer is not formed on the catalyst surface during mixing of starting HBN and an organic substance or during synthesis of CBN, thereby providing the same catalyst surface conditions as obtained through a conventional method in which a carbon source is homogeneously mixed with starting HBN. In other words, since the surfaces of a CBN synthesis catalyst have already been deteriorated when they are coated with an organic substance, no bonding is formed between the catalyst surface and the organic substance.

In contrast, according to the present invention, the CBN synthesis catalyst is brought into contact with an organic substance in a state where the catalyst surface is not deteriorated (i.e., a highly reactive state), and reaction between the organic substance contained in the organic substance layer and the CBN synthesis catalyst conceivably forms chemical bonds. The chemical bonds are considered to prevent deterioration of the catalyst component for the reason that the organic substance layer stably remains on the catalyst surface and serves as protective film in the vicinity of the catalyst surface, from the step of mixing the catalyst with starting HBN to the step of high-temperature/pressure synthesis of CBN.

The organic substance which can be used for forming an organic substance layer through contact with the CBN synthesis catalyst is at least one species selected from among a hydrocarbon, an aromatic compound, an alcohol, an ether, an amine, an aldehyde, a ketone, a carboxylic acid, an ester, and an amide. When an oxygen-containing organic compound such as an aldehyde, a ketone, or a carboxylic acid is used, such a compound having a large molecular weight is preferred. Generally, such compounds having eight or more carbon atoms are preferred. This is because when the compounds have fewer carbon atoms, the oxygen content of the organic compounds increases, thereby adversely affecting the organic layer caused by oxygen. Therefore, compounds having no oxygen atoms such as hydrocarbon, amine, and amide are more preferred.

The amount of the organic compound required for forming an organic substance layer, which depends on the particle size and species of the catalyst and the type of the organic compound, preferably falls within a range of 0.1 mass % to 50 mass % based on the catalyst, more preferably within a range of 1 mass % to 30%, further preferably within a range of 2 mass % to 20 mass %. When the amount of the organic compound is less than 0.1 mass %, the catalyst surface is not sufficiently coated with the organic substance, thereby considerably deteriorating characteristics and yield of CBN, whereas when the amount is in excess of 50 mass %, a carbon source present in an excessive amount is incorporated into a CBN crystal, thereby considerably deteriorating characteristics of CBN.

The organic substance layer formed on the surface of the CBN synthesis catalyst serves as a protective film for the catalyst surface and is considered to prevent deterioration of the catalyst which would otherwise occur by reaction with impurities such as boron oxide contained in starting HBN, for example, during melting of starting HBN into the catalyst. Thus, the lower limit of the amount of the organic substance layer is preferably 1 mass % or more, more preferably 2 mass % or more. The upper limit is preferably 30 mass % or less, more preferably 20 mass % or less, since, for example, in the case where starting HBN containing a small amount of impurity such as born oxide is used, the amount of a carbon source may increase, and the excessive carbon source may inhibit growth of CBN and may be readily incorporated into a CBN crystal.

The organic substance layer can be formed on the surface of the CBN synthesis catalyst through a method including bringing an organic substance into contact with a CBN synthesis catalyst having a surface that has not deteriorated.

Examples of specific methods will be described. When the catalyst is an alkali metal nitride, an alkaline earth metal nitride, an alkali metal boronitride, or an alkaline earth metal boronitride, the synthesized CBN synthesis catalyst is pulverized in an atmosphere where the oxygen content and water content are strictly controlled (e.g., in a gloved box) to a predetermined particle size, and then exposed to vapor of an organic substance or mixed with an organic substance in the form of liquid or solid, to thereby form an organic substance layer. Even when a deterioration-related component is formed on the CBN synthesis catalyst surface, the component may be removed through purification. Specifically, the catalyst is heated in a reducing atmosphere such as hydrogen or ammonia gas, and then brought into contact with an organic substance, thereby forming an organic substance layer.

Since the organic substance layer thus formed on the surface of the CBN synthesis catalyst serves as a protective film for the CBN synthesis catalyst surface, deterioration of the catalyst in an atmosphere which causes deterioration of a conventional CBN synthesis catalyst can be prevented. For example, even when the catalyst is handled in the atmosphere, deterioration of the catalyst is prevented by virtue of poor reactivity with oxygen and water.

There will next be described an embodiment of transformation of HBN to CBN by use of the CBN synthesis catalyst having an organic substance layer formed on the surface in the above-described manner.

Examples of HBN powder serving as a starting material include HBN powder (UHP-1$^{(TM)}$ grade, product of Showa Denko K.K.). Then, a CBN synthesis catalyst (about 1 to about 50 parts by mass) is added to HBN powder (100 parts by mass), followed by mixing by use of an apparatus such as a rocking mixer. The mixture is molded into a compact having a density of 1.5 to 2.0 g/cm³.

Subsequently, the compact is placed in a reactor (for example a reactor as described in the Example disclosed in Japanese Patent Application Laid-Open (kokai) No. 2000-290005). The compact is maintained under temperature/pressure conditions where the CBN synthesis catalyst melts and CBN remains thermodynamically stable, to thereby transform HBN to CBN.

The thermodynamically stable conditions where CBN remains thermodynamically stable are described by O. Fukunaga, Diamond Relat. Mater., 9 (2000), 7–12 and generally fall within ranges of about 4 to about 6 GPa and about 1,400 to about 1,600° C. The compact is typically maintained for about 1 second to about 6 hours.

Subsequently, a synthesis ingot (a mixture of CBN, HBN, and a CBN synthesis catalyst component) is removed from the reactor and crushed for isolating and purifying CBN.

A method for isolation and purification disclosed in Japanese Patent Publication (kokoku) No. 49-27757 may be employed. According to the method, the yielded synthesis ingot is crushed into granules of, for example, a size of 5 mm or less, and sodium hydroxide and a small amount of water are added to the granules. The mixture is heated at about 300° C., to thereby selectively dissolve HBN. The mixture is cooled, and undissolved matter is washed sequentially with acid and water and separated through filtration, to thereby yield CBN.

The thus-obtained CBN has been synthesized by use of a CBN synthesis catalyst having an organic substance layer formed on the surface. Thus, high percent transformation of HBN to CBN (CBN yield) is attained. In addition, the produced CBN has sharp edges, with sufficient development of a crystal plane. Chemical analysis of the produced CBN reveals that the CBN contains small amounts of carbon and the catalyst component as compared with conventional CBN. Thus, the CBN crystal has high strength and small drop in strength during heating.

As described above, the CBN of the present invention has high strength, small drop in strength during heating, and sharp edges, with sufficient development of a crystal plane. Thus, the CBN is suitable for abrasive grains, particularly for grinding wheels employed under severe processing conditions such as high-load grinding. In addition, through the effect of the organic substance layer formed on the surface of the CBN synthesis catalyst, the catalyst having the organic substance layer has low reactivity with oxygen, water, etc. contained in the atmosphere and thus has remarkably enhanced handling characteristics as compared with conventional CBN synthesis catalysts which must be handled with greatest care in a gloved box or a similar chamber. Therefore, use of such a CBN synthesis catalyst can simplify industrial-scale CBN production operations and steps, thereby attaining enhancement of productivity thereof.

EXAMPLES

The present invention will next be described in detail by way of examples, which should not be construed as limiting the invention thereto.

Examples 1 to 21

Under dry nitrogen gas flow, each of the catalysts listed in Table 1 was pulverized in a gloved box by use of a vibration mill, to thereby yield a powder having a particle size of 50 µm or less. The catalyst powder removed from the pulverization vessel and an organic substance in the liquid form were mixed in a combination and at a proportion shown in Table 1 by use of a rocking mixer, to thereby form an organic substance layer on the catalyst surface. When the organic substance assuming solid form at ambient temperature is employed, a mixing vessel is heated from the outside so as to maintain the liquid state of the organic compound in the mixture.

To starting HBN powder (UHP-1$^{(TM)}$ grade, product of Showa Denko K. K.) (10 parts by mass), each CBN synthesis catalyst was added in a proportion shown in Table 1, and the powder mixture was molded into a compact having a density of 1.85 g/cm³.

The compact was placed in a reactor and maintained under high-temperature/pressure conditions (1,450° C., 5.0 GPa) for 10 minutes, and the thus-formed synthesis ingot was removed from the reactor so as to isolate and collect CBN through the aforementioned method.

The ratios of the formed CBN to the starting HBN (CBN yield) obtained in Examples are shown in Table 1. Through observation, particles having sharp edges, with development of the (111) plane, were identified in the CBN particles thus obtained in all Examples.

TABLE 1

| | CBN synthesis catalyst | Organic substance | Catalyst: organic substance ratio (mass) | HBN ratio (mass) | CBN yield (%) |
|---|---|---|---|---|---|
| (1/2) | | | | | |
| Ex. 1 | $Li_3N$ | Hexane | 1:0.01 | 10 | 36 |
| Ex. 2 | $Li_3N$ | Hexane | 1:0.05 | 10 | 38 |
| Ex. 3 | $Li_3N$ | Decane | 1:0.05 | 10 | 37 |
| Ex. 4 | $Li_3N$ | Decane | 1:0.1 | 10 | 38 |
| Ex. 5 | $Li_3N$ | Decanoic acid | 1:0.05 | 10 | 36 |
| Ex. 6 | $Li_3N$ | Decanoic acid | 1:0.2 | 10 | 39 |
| Ex. 7 | $Li_3N$ | Octadecane | 1:0.1 | 10 | 40 |
| Ex. 8 | $Li_3N$ | Octadecane | 1:0.3 | 10 | 38 |
| Ex. 9 | $Li_3N$ | Octadecanoic acid | 1:0.1 | 10 | 42 |
| Ex. 10 | $Li_3N$ | Octadecanoic acid | 1:0.3 | 10 | 39 |
| (2/2) | | | | | |
| Ex. 11 | $Li_3N$ | Octadecylamine | 1:0.1 | 10 | 39 |
| Ex. 12 | $Li_3N$ | Octadecylamine | 1:0.3 | 10 | 36 |
| Ex. 13 | $Li_3BN_2$ | Decane | 1:0.1 | 10 | 41 |
| Ex. 14 | $Ca_3B_2N_4$ | Decanoic acid | 1:0.05 | 10 | 40 |
| Ex. 15 | $Ca_3B_2N_4$ | Decanoic acid | 1:0.1 | 10 | 43 |
| Ex. 16 | $Ba_3B_2N_4$ | Octadecane | 1:0.1 | 10 | 45 |
| Ex. 17 | $Ba_3B_2N_4$ | Octadecane | 1:0.2 | 10 | 43 |
| Ex. 18 | $LiCaBN_2$ | Octadecanoic acid | 1:0.05 | 10 | 53 |
| Ex. 19 | $LiCaBN_2$ | Octadecanoic acid | 1:0.1 | 10 | 52 |
| Ex. 20 | $LiBaBN_2$ | Octadecylamine | 1:0.15 | 10 | 55 |
| Ex. 21 | $LiBaBN_2$ | Octadecylamine | 1:0.5 | 10 | 51 |

Comparative Examples 1 to 3

The procedure of each of Examples 1 to 21 was repeated, except that each CBN synthesis catalyst and organic substance were mixed by use of a rocking mixer, in a combination and at a proportion shown in Table 2 in a mixing vessel in the atmosphere instead of a dry nitrogen atmosphere, to thereby fabricate a catalyst. By use of the catalyst, CBN was synthesized.

Table 2 shows the obtained CBN yield values. Through observation, a large number of particles, with development of the (111) plane as well as the (100) plane, were identified in the CBN particles.

TABLE 2

| | CBN synthesis catalyst | Organic substance | Catalyst: organic substance ratio (mass) | HBN ratio (mass) | CBN yield (%) |
|---|---|---|---|---|---|
| Comp. Ex. 1 | $Li_3N$ | Octadecane | 1:0.1 | 10 | 30 |
| Comp. Ex. 2 | $LiCaBN_2$ | Octadecanoic acid | 1:0.1 | 10 | 44 |
| Comp. Ex. 3 | $LiBaBN_2$ | Octadecyl-amine | 1:0.15 | 10 | 45 |

Comparative Example 4

A CBN synthesis catalyst, an organic substance, and starting HBN were mixed by use of a rocking mixer in a gloved box in a combination and at proportions shown in Table 3. After completion of mixing, CBN was synthesized in a manner similar to that of Examples 1 to 21.

Table 3 shows the obtained CBN yield value. Through observation, a large number of particles, with development of the (111) plane as well as the (100) plane, were identified in the CBN particles.

TABLE 3

| | CBN synthesis catalyst | Organic substance | HBN: catalyst: organic substance ratio (mass) | CBN yield (%) |
|---|---|---|---|---|
| Comp. Ex. 4 | $Ca_3B_2N_4$ | Decanoic acid | 10:1:0.1 | 31 |

Comparative Examples 5 to 10

Each CBN synthesis catalyst and starting HBN were mixed by use of a rocking mixer in a gloved box, in a combination and at proportions shown in Table 4. After completion of mixing, CBN was synthesized in a manner similar to that of Examples 1 to 21.

Table 4 shows the obtained CBN yield values. Through observation, a large number of particles, with development of the (111) plane as well as the (100) plane, were identified in the CBN particles. The produced CBN particles were blocky with a rounded shape.

TABLE 4

| | CBN synthesis catalyst | Organic substance | HBN: catalyst ratio (mass) | CBN yield (%) |
|---|---|---|---|---|
| Comp. Ex. 5 | $Li_3N$ | None | 10:1 | 25 |
| Comp. Ex. 6 | $Li_3BN_2$ | None | 10:1 | 23 |
| Comp. Ex. 7 | $Ca_3B_2N_4$ | None | 10:1 | 23 |
| Comp. Ex. 8 | $Ba_3B_2N_4$ | None | 10:1 | 26 |
| Comp. Ex. 9 | $LiCaBN_2$ | None | 10:1 | 37 |
| Comp. Ex. 10 | $LiBaBN_2$ | None | 10:1 | 39 |

Examples 22 to 25 and Comparative Examples 11 to 18

Each of CBN samples produced in Examples and Comparative Examples shown in Table 5 was classified to a grit size fraction of 140/170 defined in JIS B 4130: 1998 "Diamond/CBN tool—Particle size of diamond or CBN." The grit size fraction of 140/170 defined in JIS B 4130: 1998 is a fraction containing particles having particle size controlled as follows. Specifically, four electroform sieves having openings of 165 µm, 116 µm, 90 µm, and 65 µm, respectively, were used. The particles are classified such that 99.9% or more particles are passed through the first sieve (opening: 165 µm); less than 11% of these particles remain on the second sieve (opening: 116 µm); 85% or more of the particles that have passed through the second sieve remain on the third sieve (opening: 90 µm) and 11% or less of the same particles are passed through the third sieve (opening: 90 µm); and less than 2% particles of the particles that have passed through the third sieve are passed through the fourth sieve (opening: 65 µm). The strength of each CBN abrasive grain sample having a grit size fraction controlled to 140/170 was determined by measuring toughness—an index for impact-crush resistance of abrasive grains—of the sample.

The toughness value can be determined through the following procedure. A predetermined amount of the CBN which had been classified to 140/170 and a steel ball (about 1 g) were placed in an iron capsule (2 mL). A plurality of such capsules were vibrated by means of a vibrator at a frequency of 3,000±100 times/min for 30.0±0.3 sec, whereby CBN contained in the capsules were pulverized by the mediation of steel balls. The thus-obtained powder was classified by use of a sieve (75 µm), and by calculating the percentage of the mass of CBN remaining on the sieve to the total mass of the powder. The measurement results are shown in Table 5.

In another case, the CBN particles which had been classified to 140/170 were heated under the conditions of 1,100° C. for one hour in the atmosphere, then toughness was determined in the same way. Percent decrease in toughness based on the toughness value of the sample before heating was calculated. Values of percent decrease in toughness caused by heating are shown in Table 5. In addition, the CBN particles which had been classified to 140/170 were chemically analyzed so as to investigate the catalyst component(s) (metallic element(s) contained in the catalyst) contained in CBN. Some of the samples were analyzed in terms of the amount of carbon contained in CBN. The results are shown in Table 5.

TABLE 5

| | CBN | Strength of CBN particles Before heating | Strength of CBN particles Drop in strength caused by heating (%) | Catalyst component content in CBN (1 mol) (x10⁻⁴ mol) | Carbon content of CBN (mass %) |
|---|---|---|---|---|---|
| Ex. 22 | Ex. 7 | 74 | 9 | 5.3 | — |
| Ex. 23 | Ex. 15 | 72 | 10 | 6.8 | 0.01 |
| Ex. 24 | Ex. 19 | 79 | 7 | 4.0 | — |
| Ex. 25 | Ex. 20 | 81 | 5 | 2.4 | — |
| Comp. Ex. 11 | Comp. Ex. 1 | 65 | 20 | 10.1 | — |
| Comp. Ex. 12 | Comp. Ex. 2 | 68 | 18 | 9.6 | — |
| Comp. Ex. 13 | Comp. Ex. 3 | 70 | 18 | 11.8 | — |
| Comp. Ex. 14 | Comp. Ex. 4 | 66 | 22 | 12.4 | 0.17 |
| Comp. Ex. 15 | Comp. Ex. 5 | 59 | 31 | 16.9 | — |
| Comp. Ex. 16 | Comp. Ex. 7 | 57 | 29 | 17.3 | 0.01 |
| Comp. Ex. 17 | Comp. Ex. 9 | 64 | 26 | 14.1 | — |
| Comp. Ex. 18 | Comp. Ex. 10 | 65 | 28 | 13.5 | — |

Example 26 and Comparative Example 19

Each of the CBN particles obtained in Example 20 and Comparative Example 3 were classified to a grit size fraction of 140/170 defined in JIS B 4130: 1998. By use of each classified CBN particles, a grinding wheel segment was fabricated. Specifically, a mixture containing CBN, a borosilicate glass bond serving as a binding agent, and a binder (phenolic resin) was prepared; the mixture was press-formed at 150° C.; and the resultant compact was fired at 1,100° C. (in the atmosphere). The employed binder burnt to form pores during firing for producing a grinding wheel. The proportions of the abrasive grains, bond, and binder incorporated to form the mixture were 50% by volume, 20% by volume, and 10% by volume, respectively. The porosity of the fired product was found to be 30% by volume. Each of the thus-produced grinding wheel segments was bonded to an aluminum substrate, to thereby form a grinding wheel, and the grinding wheel was subjected to a grinding test under the following conditions. The results are shown in Table 6.

Grinding wheel; 1A1 type, 150D×5U×3X×76.2H
Grinding machine; Horizontal-spindle surface grinding machine (grinding wheel spindle motor: 3.7 kW)
Workpiece; SKH-51 (HRc=62 to 64)
Surface area of workpiece: 200 mm (length)×100 mm (width)
Method of grinding; Wet surface traverse grinding
Grinding conditions;
Wheel speed: 1,800 m/min
Table speed: 15 m/min
Cross feed: 5 mm/pass
Infeed: 40 μm
Coolant; Exclusively for cBN (aqueous, ×50 diluted)

The shape of the grinding wheel is represented by a symbol defined in JIS B 4131: 1998 "Diamond/CBN tool—diamond or CBN wheel." In the grinding wheel employed in the Example and Comparative Example, the metallic substrate has a disk-like shape, the cross-section of the abrasive grain layer is rectangular, and the abrasive grain layer is disposed on the outermost periphery. The grinding wheel has dimensions of 150 mmφ in outer diameter, 5 mm in abrasive grain layer width, 3 mm in abrasive grain layer thickness, and 76.2 mmφ in grinding wheel-disposed hole size.

The type of the workpiece is represented by a symbol defined in JIS G 4403 "High-speed tool steel material." In the Example, a commercial steel material was worked so as to have predetermined dimensions and hardness and employed as the workpiece.

TABLE 6

| | Abrasive grains | Grinding ratio | Grinding power (W) |
|---|---|---|---|
| Ex. 26 | Ex. 20 | 382 | 1,870 |
| Comp. Ex. 19 | Comp. Ex. 3 | 276 | 2.250 |

As described above, the CBN yield values obtained in the Examples were higher than those obtained in the Comparative Examples employing a catalyst of the same chemical species. The CBN synthesis catalyst employed in the Examples exhibited higher performance of transformation from HBN to CBN.

The amount of a catalyst component incorporated into CBN is smaller in Examples than in Comparative Examples. In Examples, higher toughness values were obtained, and smaller drops in toughness value caused by heating were obtained.

Furthermore, the CBN crystals obtained in Examples had sharp edges. In the CBN crystals, the (111) plane was more developed as compared with CBN crystal obtained in Comparative Examples.

As described hereinabove, the CBN of the present invention has a smaller amount of a catalyst component incorporated into the catalyst as compared with conventional CBN, and can be produced by use of the CBN synthesis catalyst of the present invention. The CBN of the present invention has high strength, exhibits small drop in strength caused by heating, and has sharp edges, with good development of the (111) plane. Thus, the CBN is suitable for grinding wheels employed under severe grinding conditions such as high-load grinding.

The CBN synthesis catalyst of the present invention is formed by coating the surface of the CBN synthesis catalyst with an organic substance layer. By virtue of the effect of the organic substance layer, deterioration of the catalyst is prevented from the step of handling of the CBN synthesis catalyst to the step of CBN synthesis, thereby attaining high CBN yield and reducing the amount of a catalyst component incorporated into CBN.

In addition, after formation of the organic substance layer, the CBN synthesis catalyst of the present invention has reduced reactivity with oxygen, water, etc. Therefore, deterioration of the CBN synthesis catalyst can be prevented, even in the case where the CBN catalyst is not handled in a conventional manner; i.e., handling in a chamber such as a gloved box where inert, dry gas (e.g., dry nitrogen) flow is maintained. Thus, CBN can be produced at high productivity through a simple step and simple operation.

What is claimed is:

1. A catalyst useful for the synthesis of cubic boron, nitride, said catalyst being in the form of a powder having a particle size of 150 μm or less, and said catalyst having an organic substance layer formed on the surface thereof under an inert gas atmosphere.

2. The catalyst as claimed in claim 1, wherein the organic substance layer contains an organic substance which is chemically bonded with the cubic boron nitride synthesis catalyst.

3. The catalyst as claimed in claim 1, which contains at least one species selected from the group consisting of an alkali metal, an alkaline earth metal, an alkali metal nitride, an alkaline earth metal nitride, an alkali metal boronitride, an alkaline earth metal boronitride, a complex alkali metal boronitride, a complex alkaline earth metal boronitride, and a complex alkali metal-alkaline earth metal boronitride.

4. The catalyst as claimed in claim 3, which is a nitride or a boronitride.

5. The catalyst as claimed in claim 4, which contains at least one species selected from the group consisting of lithium nitride, lithium boronitride, calcium nitride, calcium boronitride, barium nitride, barium boronitride, lithium calcium boronitride, and lithium barium boronitride.

6. The catalyst as claimed in claim 5, which contains at least one species selected from the group consisting of lithium calcium boronitride and lithium barium boronitride.

7. The catalyst as claimed in claim 6, which is lithium barium boronitride.

8. The catalyst as claimed in claim 1, wherein the organic substance layer contains an organic substance which is at least one species selected from the group consisting of a hydrocarbon, an alcohol, an ether, an amine, an aldehyde, a ketone, a carboxylic acid, an ester, and an amide.

9. The catalyst as claimed in claim 1, wherein the organic substance layer contains an organic substance which is at least one species selected from the group consisting of a hydrocarbon, an amine, and an amide.

10. The catalyst as claimed in claim 9, wherein the organic substance contained in the organic substance layer is an amine.

11. The catalyst as claimed in claim 10, wherein the organic substance contained in the organic substance layer is octadecylamine.

12. The catalyst as claimed in claim 1, wherein the organic substance layer contains an organic substance which is at least one species selected from the group consisting of an alcohol, an ether, an aldehyde, a ketone, a carboxylic acid, and an ester.

13. The catalyst as claimed in claim 12, wherein the organic substance contained in the organic substance layer has eight or more carbon atoms.

14. The catalyst as claimed in claim 13, wherein the organic substance contained in the organic substance layer is decanoic acid or octadecanoic acid.

15. The catalyst as claimed in claim 1, wherein the organic substance contained in the organic substance layer is a compound having no oxygen in the molecule thereof.

16. A method for producing cubic boron nitride which includes synthesizing cubic boron nitride by use of a the catalyst as recited in claim 1.

* * * * *